Oct. 12, 1954     E. L. YOUNKER     2,691,759

DEVICE FOR DIELECTRIC CONSTANT DETERMINATION

Filed March 1, 1946

*INVENTOR.*
ELMER L. YOUNKER

BY

ATTORNEY

Patented Oct. 12, 1954

2,691,759

UNITED STATES PATENT OFFICE 2,691,759

DEVICE FOR DIELECTRIC CONSTANT DETERMINATION

Elmer L. Younker, Whippany, N. J., assignor, by mesne assignments, to the United States of America as represented by the Secretary of the Navy Application March 1, 1946, Serial No. 651,298

6 Claims. (Cl. 324—58)

This invention relates to a measuring device, and more particularly to a device for dielectric constant measurement.

Heretofore it was known that the dielectric constant of a material could be determined if the wavelength of power flowing through the material from a signal generator, the wavelength of the power in air from the signal generator, and the cutoff wavelength of a waveguide containing a sample of the material for dielectric constant measurement were known.

If it were possible to investigate the standing wave pattern in the portion of the waveguide containing the sample of material, the wavelength of the power flowing through the material could be determined by measuring the distance between successive minima in the standing wave pattern. An investigation of standing wave patterns is ordinarily made by inserting a pick-up probe into the waveguide perpendicular to the electric field through a thin longitudinal slot in the center of the waveguide wall. This method is impractical in most dielectric constant measurements because it is impossible to move a pick-up probe through a waveguide containing a sample of material.

It is an object of this invention to provide apparatus for measuring the dielectric constant of a material.

It is a further object of this invention to provide apparatus for determining the wavelength of power flowing through a material of solid or fluid form.

These and other objects will be more apparent upon consideration of the following description together with the accompanying drawing, in which.

Figure 1:
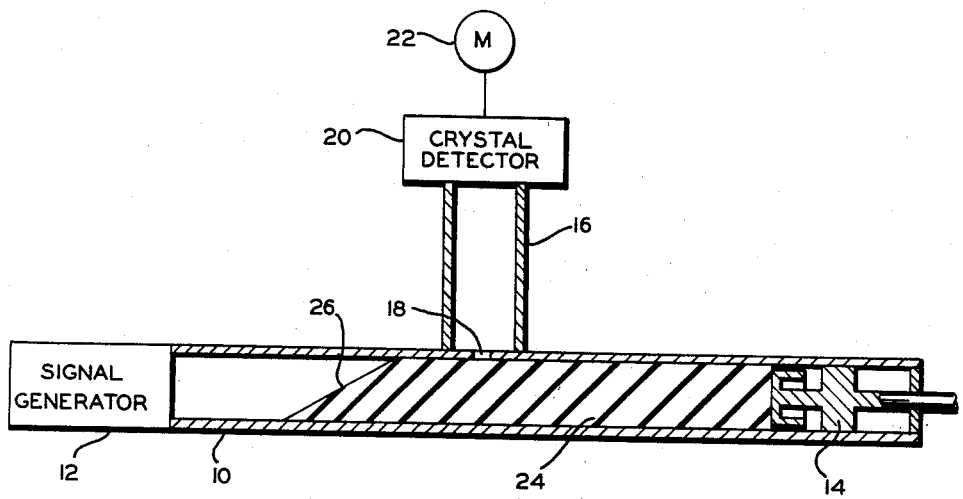
Fig. 1 is a longitudinal sectional view of an embodiment of the invention.

In Fig. 1 is disclosed a rectangular waveguide 10. A signal generator 12 operating at a frequency passable in waveguide 10 and carefully matched thereto injects power into one end thereof. A choke plunger 14 is inserted in the other end of waveguide 10 and is movable longitudinally therein. A second waveguide 16 of shape similar to that of waveguide 10 is loosely coupled thereto by means of an aperture 18 located in the center of one of the wide walls of waveguide 10. A crystal detector 20 is coupled to the free end of waveguide 16 to rectify the voltages therein. The output of crystal detector 20 is fed into microammeter 22.

A tapered sample of the material, the value of whose dielectric constant is to be measured, 24, is formed with cross-sectional dimensions equal to those of waveguide 10 and with length equal to at least one full wavelength of the power to be transferred through it. Sample 24 is received by waveguide 10 as shown in Fig. 1, and secured by any suitable means to choke plunger 14 so as to be movable therewith. Choke plunger 14 also acts as a short circuit termination for waveguide 10 effective at the adjacent end of sample 24. Power from signal generator 12 flows along waveguide 10 and upon being reflected by choke plunger 14 sets up a standing wave pattern in waveguide 10 containing sample 24. The characteristics of the standing wave pattern at the particular point in sample 24 where aperture 18 is located are observed on meter 22. As sample 24 and choke plunger 14 are moved along the guide through a full wavelength of the power being transferred through sample 24, the indicator on meter 22 rises and falls in a substantially sinusoidal pattern. An indication of the wavelength of the power being transferred through sample 24 is obtained by observing how far choke plunger 14 is moved between successive minimum readings on meter 22. If the distance between successive minima is designated $d$, the dielectric constant E of the material is given by the equation $$E=\left(\frac{\lambda}{2d}\right)^2+\left(\frac{\lambda}{\lambda_c}\right)^2$$

where $\lambda$ is the wavelength of the power from the signal generator 12 in air and $\lambda_c$ is the cutoff wavelength of waveguide 10.

Figure 2:
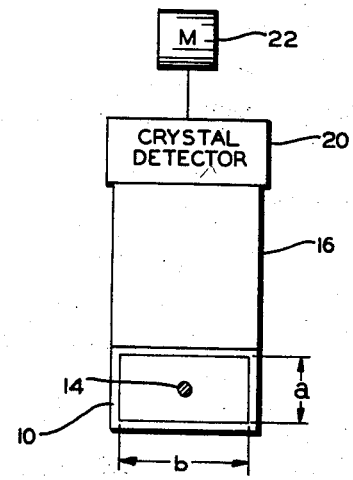
Fig. 2 is an end view of the embodiment in Fig. 1.

From Fig. 2, it is evident that aperture 18 is located in the wide dimension $b$, of waveguide 10, so that none of the current paths are distorted and the fields within waveguide 10 are the same as they would have been if aperture 18 were not present. Waveguide 16 is excited in proportion to the magnitude of the electric field in waveguide 10. The very loose coupling obtained is necessary to prevent an impedance from being reflected into waveguide 10 and interfering with the standing wave pattern therein.

The $TE_{0,1}$ mode, which is the dominant mode in a rectangular waveguide, is employed in the present invention. To permit propagation of this mode, the $b$ dimension of waveguide 10 is larger than $\lambda/2$ but, in order to exclude higher modes, is less than $\lambda$. To prevent the excitation and propagation of $TE_{1,0}$ mode, waveguide 10 is made as small as practical in the narrow dimension *a*, and sample 24 should have a taper 26 in the plane of the electric field as shown in Fig. 1. The exact dimensions of the taper 26 are not critical for dielectric constant measurement.

What is claimed is:

1. A device for measuring the dielectric constant of a sample comprising, a waveguide of dimensions suitable for receiving said sample, a choke plunger inserted in one end of said waveguide and capable of attachment to one end of said sample, a source of power connected to the other end of said waveguide for injecting power therein and matched thereto, means for measuring the standing wave intensity at a predetermined point in said waveguide produced by said source of power and said choke plunger, said sample being movable with said choke plunger longitudinally along said waveguide to determine the standing wave pattern in said sample.

2. A device for measuring the dielectric constant of a sample comprising, a waveguide of dimensions suitable to receive said sample, a choke plunger inserted in one end of said waveguide capable of attachment to one end of said sample and movable longitudinally along said waveguide with said sample, a signal generator connected to the other end of said waveguide and matched thereto for injecting power therein, a second waveguide loosely coupled at one end to said first waveguide, a detector connected to the free end of said second waveguide, and a meter for measuring the output of said detector.

3. A device for measuring the dielectric constant of a sample comprising, a rectangular waveguide of dimensions suitable to receive said sample, a choke plunger inserted in one end of said waveguide, capable of attachment to said sample, movable longitudinally along said waveguide with said sample, and providing short circuit termination in said waveguide adjacent to said sample, a signal generator of a frequency passable in said waveguide connected to the other end thereof for injecting power therein and matched thereto, a second waveguide of shape similar to said first waveguide and joined to a wide wall thereof, an aperture in said wide wall loosely coupling said first waveguide to said second waveguide, a crystal detector connected to the free end of said second waveguide for rectifying the voltages therein, and a microammeter for measuring the output of said crystal detector.

4. In combination, a section of wave guide, a generator coupled to one end of said section for transmitting electromagnetic energy of a known frequency therethrough, a dielectric member disposed within said wave guide and having cross-sectional dimensions substantially equal to those of said guide, a detector coupled to said guide and means for moving said dielectric member past said detector while maintaining a short circuit across said guide at the end of said member remote from said generator thereby to determine the distance between adjacent voltage minima of the standing wave developed within said dielectric member by the reflection of said electromagnetic energy at said short circuit.

5. In combination, a wave guide section, a source of electromagnetic energy coupled to one end of said section, a dielectric member disposed within said wave guide and having cross-sectional dimensions substantially equal to those of said wave guide, said dielectric member having a tapered end directed towards said source of energy whereby electromagnetic energy propagated through said guide is coupled into said dielectric member with a minimum of reflection, a detector connected to said wave guide, means for moving said dielectric member relative to said detector while maintaining a short-circuited wave guide termination at the other end of said member thereby to determine the distance between adjacent voltage minima of the standing wave produced within said dielectric member as a result of the electromagnetic energy reflection at said short-circuited termination.

6. In an arrangement as defined in claim 5 wherein said means for moving said dielectric member comprising a choke plunger mounted in the other end of said wave guide section, said plunger contacting the other end of said dielectric member.

References Cited in the file of this patent

UNITED STATES PATENTS

| Number | Name | Date |
|--------|------|------|
| 2,358,462 | Mahren | Sept. 19, 1944 |
| 2,376,785 | Krasik | May 22, 1945 |
| 2,403,289 | Korman | July 2, 1946 |
| 2,454,530 | Tiley | Nov. 23, 1948 |